May 25, 1926.
A. F. W. STÅHLBERGER
1,585,796
DEVICE FOR TRANSFORMING A RECIPROCATING MOTION INTO A ROTARY MOTION
Filed April 8, 1924
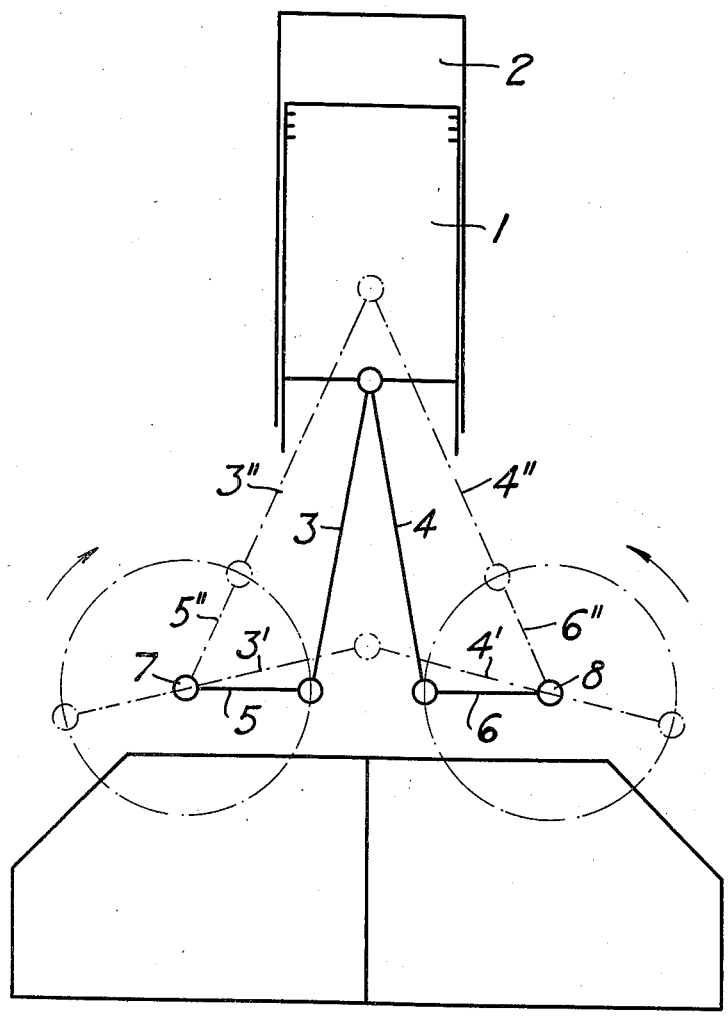

Patented May 25, 1926.

1,585,796

UNITED STATES PATENT OFFICE.

AXEL FILIP WALDEMAR STÅHLBERGER, OF STOCKHOLM, SWEDEN.

DEVICE FOR TRANSFORMING A RECIPROCATING MOTION INTO A ROTARY MOTION.

Application filed April 8, 1924. Serial No. 705,081.

The present invention relates to an improvement in such devices for transforming a reciprocating motion into a rotary motion, which comprises a body having a linear reciprocating motion, two rotary crank shafts disposed symmetrically in relation to the path of said body and parallel or substantially parallel with each other, and connecting rods between the latter and said shafts.

The object of the invention is to provide such a construction of a device of the aforesaid kind that a power applied to the reciprocating body will be transmitted to the said shafts during an angle of the crank circles considerably exceeding 180°, the turning moment working on the shafts being very large and approximately uniform during nearly the whole of said angle.

The invention consists, chiefly, in that the length of the connecting rods is so proportioned in relation to the crank radius and the distance between the two shafts that the angle between the connecting rods in the one end position of the reciprocating body is greater than 90°.

In the accompanying drawing I have shown diagrammatically one embodiment of my invention.

Referring to the drawing, 1 indicates the piston, for instance of an internal combustion engine, moveable up and down in a cylinder 2. To the lower end of said piston are hinged in well known manner, connecting rods 3 and 4, which are each connected to the cranks 5 and 6 respectively of shafts 7 and 8 respectively. Said shafts are likewise in well known manner parallel or substantially parallel with each other and arranged at each side of and symmetrically in relation to the path of the piston. The distance between said shafts and the length of the connecting rods are so chosen that the connecting rods in the lower dead point position of the piston form with each other an angle greater than 90°, as is indicated by the dot- and-dash lines 3¹ and 4¹ in the drawing. In the upper dead point position of the piston the connecting rods and the cranks will be in the positions indicated by the dot- and-dash lines 3¹¹, 5¹¹ and 4¹¹, 6¹¹ respectively. When the engine is running ahead, the shafts 7 and 8 rotate in the directions indicated by the arrows. During the downward power developing stroke of the piston, the connecting rods 3 and 4 drive the shafts 7 and 8 during an angle of the crank circle that exceeds considerably 180°, and during nearly the whole of this angle the turning moment actuating the shafts remains approximately uniform, on account whereof the efficiency of the engine will be considerably larger than that of devices of the kind in question hitherto known,

Having now described my invention what I claim is:

1. A device for transforming reciprocatory motion into rotary motion and vice versa, comprising a pair of rotary members, a single reciprocating member, either the reciprocating member or the rotary members having power directly applied thereto, cranks on the rotary members and two connecting rods directly connecting the reciprocating member to said cranks, to directly transmit power therebetween, the lengths of said connecting rods being so chosen in relation to the crank radii and the distance between the crank shafts that the connecting rods in one end position of the reciprocating member form with each other an angle greater than ninety degrees.

2. A device for transforming reciprocatory motion into rotary motion and vice versa, comprising a pair of rotary members, a single reciprocating piston, either the piston or the rotary members having power directly applied thereto, cranks on the rotary members and two connecting rods connecting the piston and cranks, the lengths of said connecting rods being so chosen in relation to the crank radii and the distance between the crank shafts that the connecting rods in one end position of the piston form with each other an angle greater than ninety degrees.

3. A device for transforming reciprocatory motion into rotary motion and vice versa, comprising a pair of parallel shafts, cranks of equal lengths on said shafts, a reciprocating piston, a pair of connecting rods of equal lengths connecting the piston and cranks the lengths of said connecting rods being so chosen in relation to the crank radii and the distance between the crank shafts that the connecting rods in one end position of the piston form with each other an angle greater than ninety degrees.

4. A device for transforming reciprocatory motion into rotary motion and vice versa, comprising a reciprocating member and two cranks lying substantially in the same plane two connecting rods directly connecting the reciprocating member and cranks in which either the cranks or the reciprocating member shall be the direct and prime power applying elements of the combination, the lengths of said connecting rods being so chosen in relation to the crank radii and the distance between the crank shafts that the connecting rods in one end position of the reciprocating member form with each other an angle greater than ninety degrees and approaching 180°.

In testimony whereof I have hereunto subscribed my name this 21st day of March, 1924.

AXEL FILIP WALDEMAR STÅHLBERGER.